United States Patent [19]

Leonard

[11] Patent Number: 4,697,372
[45] Date of Patent: Oct. 6, 1987

[54] DOORLESS, POSITIVE-SPREADING TRAWLING APPARATUS

[76] Inventor: Albert A. Leonard, P.O. Box 209, Quinebaug, Conn. 06262

[21] Appl. No.: 807,252

[22] Filed: Dec. 10, 1985

[51] Int. Cl.4 .......................................... A01K 73/02
[52] U.S. Cl. ............................................................ 43/9
[58] Field of Search ................................................ 43/9

[56] References Cited

U.S. PATENT DOCUMENTS

| | | |
|---|---|---|
| 1,913,425 | 6/1933 | Black . |
| 2,300,178 | 10/1942 | Ross . |
| 2,513,153 | 6/1950 | D'Intino ........................ 43/9 X |
| 3,132,437 | 5/1964 | Luketa . |
| 3,299,559 | 1/1967 | Luketa ............................... 43/9 |
| 3,316,670 | 5/1967 | Johnson . |
| 3,366,969 | 1/1968 | Luketa . |
| 4,224,755 | 9/1980 | Bourret . |

FOREIGN PATENT DOCUMENTS

| | | | |
|---|---|---|---|
| 89890 | 10/1960 | Denmark .................... | 43/9 |
| 80445 | 7/1952 | Norway ...................... | 43/9 |
| 427683 | 2/1975 | U.S.S.R. ..................... | 43/9 |

OTHER PUBLICATIONS

Buls, "The MT 250 Net Sounder . . .", National Fisherman, Apr. 1985, p. 38.
Matsen, "The New Supervees!", National Fisherman, Aug. 1985, pp. 27-28.
Amos "Duncan Amos Opens a World of Doors", National Fisherman, Aug. 1985, pp. 24-26.
Holman, "'Autotrawl' Gear . . . ", National Fisherman, Aug. 1985, pp. 40-41.

Primary Examiner—Nicholas P. Godici
Assistant Examiner—Carmine Cuda
Attorney, Agent, or Firm—Blodgett & Blodgett

[57] ABSTRACT

The doorless trawling apparatus provides for positive spreading of the opening of a trawling net by means of a plurality of toggle spreading bars which spread the net by a combination of towing force and water resistance. The net may be collapsed for hauling in or avoiding obstructions by a positively activated collapse mechanism or a safety release. The trawling depth is controlled by a variable buoyancy float system.

7 Claims, 7 Drawing Figures

DOORLESS, POSITIVE-SPREADING TRAWLING APPARATUS

BACKGROUND OF THE INVENTION

Profitable and competitive trawl fishing calls for the dragging of a large net behind a powerful fishing boat. The net is hauled by a complex assembly of warp lines forming the tow gear. The net must be long and narrow for efficient collection of the catch, but must sweep a large area, in terms of opening cross-section, in order to collect as many fish as possible in one pass. Since a large-mouthed net does not have a natural tendency to open widely, the mouth of the net must be spread open during a trawling pass. It is the common practice in this art to use hydrodynamic spreaders ranging in complexity from primitive, rectangular, flat wooden "otter" doors through sophisticated oval, cambered, slotted steel doors. These doors use a sideways or radially directed hydrodynamic "lift" to spread the net mouth during a trawling pass. The most effective doors tend to be heavy, awkward, devices requiring complex and expensive hauling gear; and presenting a large amount of forward resistance to the dragging vessel. The standard "V" doors of the bottom dragger tend to be unstable on rough ground. Less cumbersome new Japanese trawls, having spreading power provided by semi-rigid fabric wings on aluminum frames, appear to have a speed limitation as they are presently developed.

The doors of present trawl nets are usually designed for only one or another of the various possible trawling depths; shallow, mid-water, and bottom dragging. Changing from one type of trawling to another usually means a change of doors and other gear is the change can be made at all with equipment on hand on the particular vessel involved.

Nets with presently available doors are difficult to haul in, especially these of bottom draggers which have hung up on obstructions on the ocean floor.

These and other difficulties of the prior art nets have been obviated in a novel manner by the present invention.

It is therefore, a primary object of the present invention to provide a trawling apparatus utilizing a positive spreading net which is spread without the use of doors, thereby achieving economy by reducing water resistance as well as by reducing warp hardware and handling time.

Another major object of the present invention is to provide a trawling apparatus in which the spreading apparatus may be reversed to collapse the net for hauling in.

A further object of the present invention is to provide a trawling apparatus which may be used at a variety of trawling depths without hauling in the gear and resetting.

Another object of the invention is to provide a trawling apparatus which is equipped with a drag tension monitor and safety release.

A still further object of the invention is to provide a trawl system which is adapted to be fully monitored and controlled for largely automated operation.

Another object of the invention is to provide a trawling apparatus which is simple in construction, economical to manufacture, and capable of a long life of useful service with minimum maintenance.

With these and other objects in view, as will be apparent to those skilled in the art, the invention resides in the combination of parts set forth in the specification and covered by the claims appended hereto.

SUMMARY OF THE INVENTION

The present invention is a mechanism for spreading the opening of an elongated bag-shaped trawling net. The mechanism contains a plurality of spreading bars extending from a common connecting element which lies basically along the axis of the elongated net. Each spreading bar is free to swing from a closed position along the main axis of the bag to a positively limited, open position at an angle away from the main axis of the net. The spreading bars are pivoted to the main connecting element at one end and to the edge of the opening of the net at the other end. The spreader bars are attached to the common connecting element by a demi-toggle mechanism. The demi-toggle mechanism preferably comprises a slider assembly secured to the axial common connecting element and capable of longitudinal movement. This assembly comprises a sleeve and a plurality of pivot points. Mediator bars extend from the slider assembly to each of the spreader bars, the mediator bars being pivotally connected to the slider assembly as well as pivotally connected to the spreader bars. When force from tow gear connected to the slider assembly is applied in this aspect of the invention, the slider is moved forward toward the limit of its longitudinal motion imparting force to the mediator bars, thence to the spreader bars, thereby imparting radial spreading force to the edges of the opening of the net.

The invention further involves mechanisms for producing an aft force on the slider assembly to collapse the net for hauling in. The invention further involves a connecting mechanism capable of transducing a measurement of the drag force on tow gear and of releasing the trawl assembly if necessary. Further aspects of the invention involve a system of selectively controlling the buoyancy of the trawl assembly to allow selection of a fishing depth.

BRIEF DESCRIPTION OF THE DRAWINGS

This invention may be best understood by reference to the possible structural forms, as shown in the drawings, in which.

DESCRIPTION OF THE PREFERRED EMBODIMENT

Figure 1:
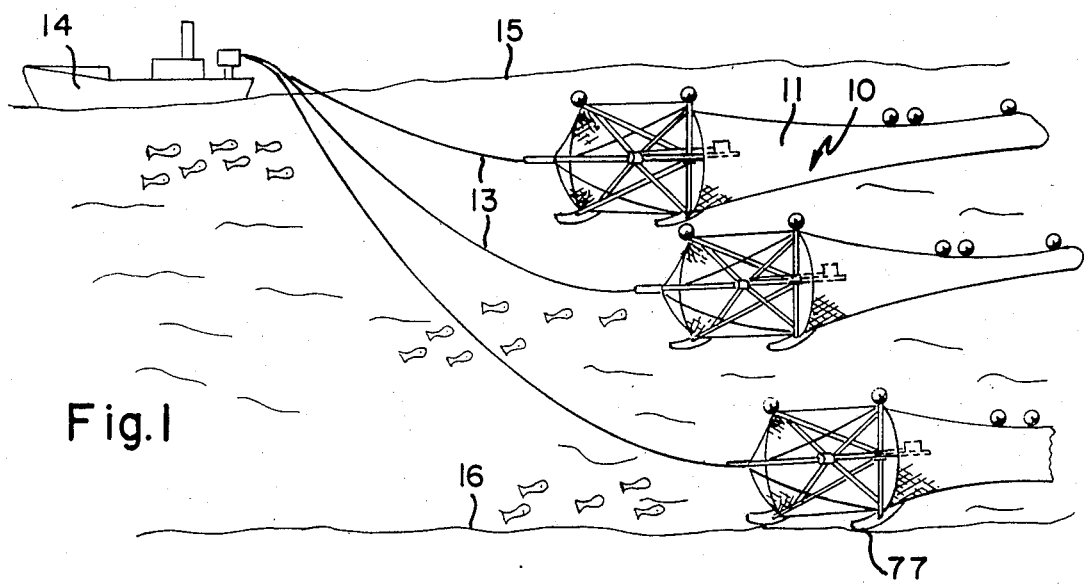
FIG. 1 is a perspective view of a multiple net trawling system, each of the nets of which utilizes the present invention.

The trawl fishing system illustrated in FIG. 1 utilizes a plurality of doorless trawling apparatus according to the present invention. The general features of the invention are there illustrated. The doorless trawling apparatus, indicated generally by the numeral 10, consists basically of an elongated, bag-shaped net 11 of the type well-known in the trawl fishing industry. The net spreading mechanism of the present invention 12 is located in the forward opening of the elongated net. Each of the trawling apparatus is dragged behind a fishing vessel 14 by the force exerted through tow gear 13, such as warp lines and wires. As the illustration suggests, the trawling apparatus is operable close to the surface 15 of the water, along the bottom 16, or in intermediate positions, depending upon the location of the fish.

Figure 2:
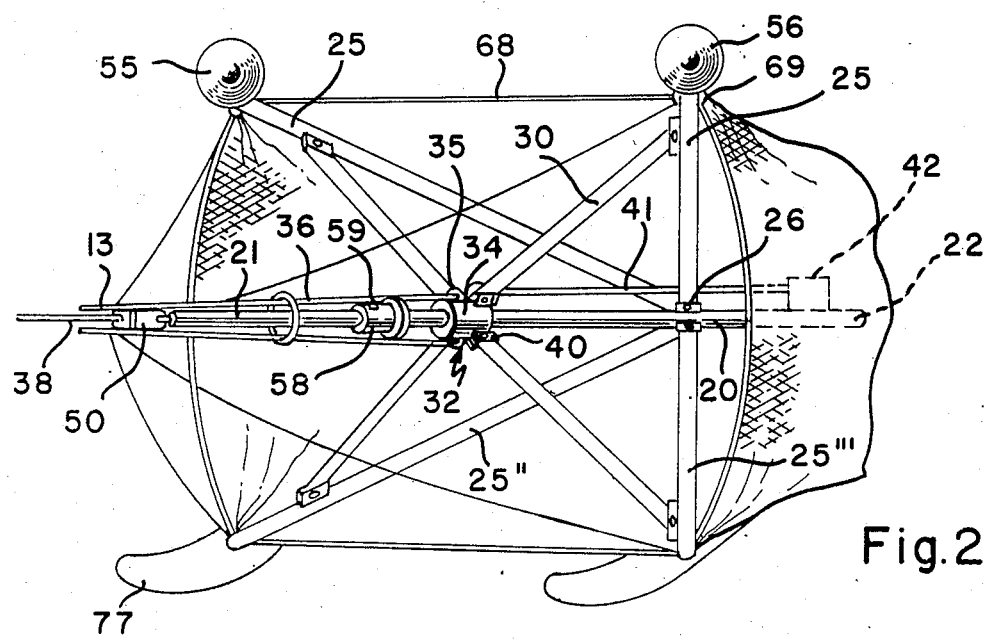
FIG. 2 is a perspective view of a doorless spreading mechanism according to the present invention.

As shown in FIG. 2, the doorless, positive spreading mechanism consists principally of a common connecting element 20 aligned along the axis of the elongated net, and a plurality of spreading bars 25, 25', 25'', and 25'''. The common connecting element is oriented to have a forward end 21 and an aft end 22. The spreader bars are pivotally attached at one end each to the common connecting element, leaving a free end on each spreading bar. The net 11 is connected at its opening end to each of the free ends of the plurality of spreading bars. This connection is preferably detachable to facilitate net repair, cleaning, etc. The freedom of the spreading bars, such as 25 to pivot away from the common connecting element 20 is limited to a predetermined angle partly by means of mediator bars, such as 30. Each such mediator bar is pivotally connected at one end to the respective spreader bar and at the other end to a slider assembly 32. Each mediator bar is connected to the slider assembly at pivot points, such as 33 such as by parallel flanges holding transverse pins. The pivot points are located on a sleeve 34 surrounding the common connecting element 20 and capable of longitudinal movement along the common connecting element. The sleeve is provided with an attachement means 35 for one or more warp lines such as 36. The common connecting element may itself be provided with an attachment means 37 for attachment of an additional warp line 38, so that force may be independently applied to the common connecting element 20 and the sleeve 34 of the slider assembly 32.

The sleeve may be provided with attachment means 40 for an additional independent haul-back line 41 running to a haul-back mechanism 42 toward the aft end 42 of the common connecting element.

In the preferred embodiment the warp gear is connected to the common connecting element by means of a fixture 50 incorporating both a tension transducer and a safety release mechanism.

In the preferred embodiment the trawling assembly is provided with a plurality of variable buoyancy floats, such as 55 and 56 of FIG. 2. Such floats may be provided along the entire length of the elongated net.

Figure 3:
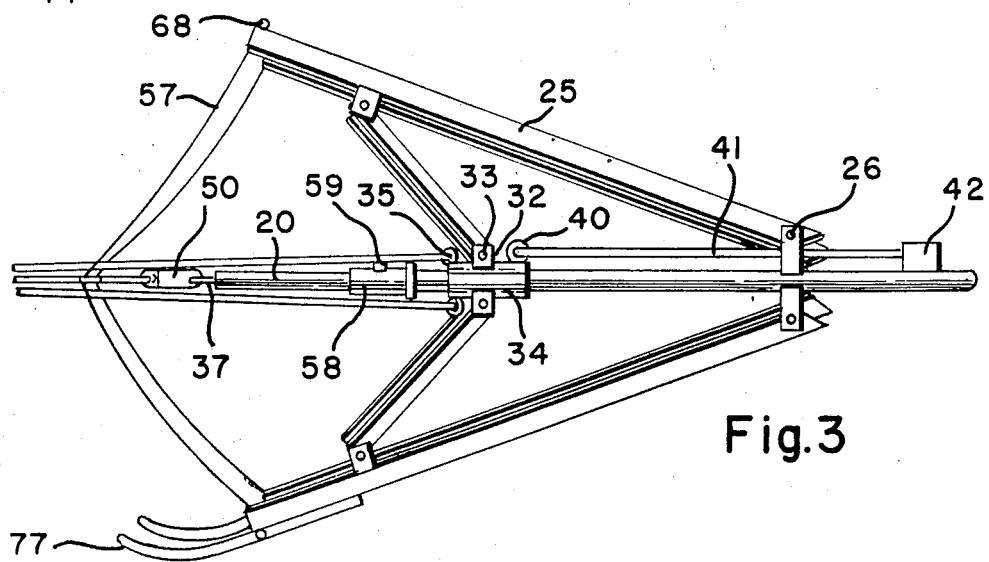
FIG. 3 is a side view of the spreader mechanism.

A side view of the positive spreader mechanism in almost completely open configuration is shown in FIG. 3. The pivot means 26 connecting the spreader bars to the common connecting element 20 and the sleeve attachment means 35 connecting the mediator bars such as 30 to the sleeve are each preferably formed to limit the pivot to a predetermined angle to the common connecting element of less than 90°. This can be accomplished, among other ways, simply by a judicious selection of the pivot point on the respective bar someways in from the end. A safety wire 57 may be provided from the end of each spreader bar to the additional warp line 38 at a point forward of the fixture 50.

Figure 4:
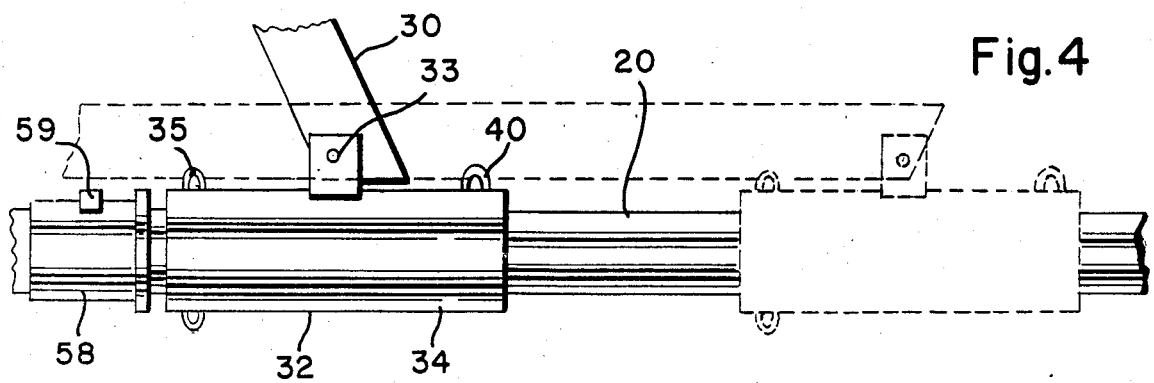
FIG. 4 is a detail view of the connection of the slider assembly with a mediator bar, shown in both open and closed configuration.
Figure 5:
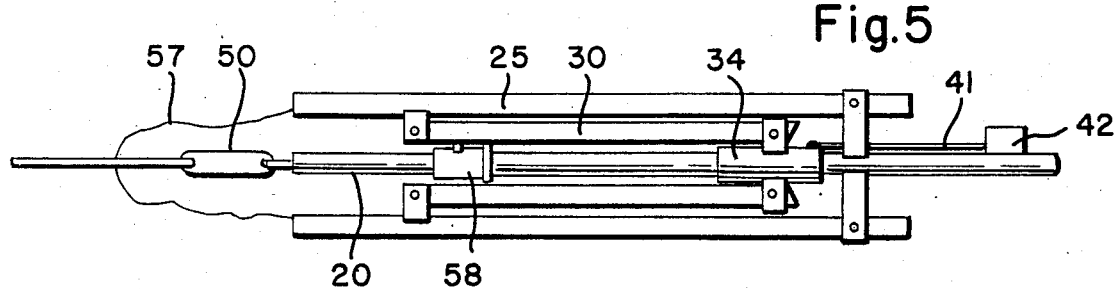
FIG. 5 is an illustration of the spreader mechanism in collapsed configuration.

FIG. 4 illustrates the action of the slider assembly 32 at the pivot point of the attachment of the mediator bar 30. The mechanism is shown in solid lines in its open or spread configuration and is shown in dotted lines in its closed configuration. The entire spreader mechanism is shown in closed configuration in FIG. 5.

To provide a more positive limit to the forward longitudinal movement of the slider, an adjustable stop 58 may be provided on the common connecting element. As illustrated in FIG. 4, the stop is preferably in the form of another slidable sleeve with a limited range of longitudinal motion and a securing means 59 such as a positive-engagement set screw, detent, or the like. The stop is adjustable in its longitudinal location, providing control over the width of opening of the net. This allows fine-tuning of the spreader mechanism to balance desirable net opening against water resistance.

The net is preferably attached to the spreader mechanism by means which allow quick and easy attachment and detachment. Means to accomplish this attachment include the provision of a strong peripheral rope or wire 68 permanently embedded in the edge of the net opening. Hand- or tool-operable clips 69 are then provided to connect the peripheral wire to the end of each spreader bar.

Figure 6:
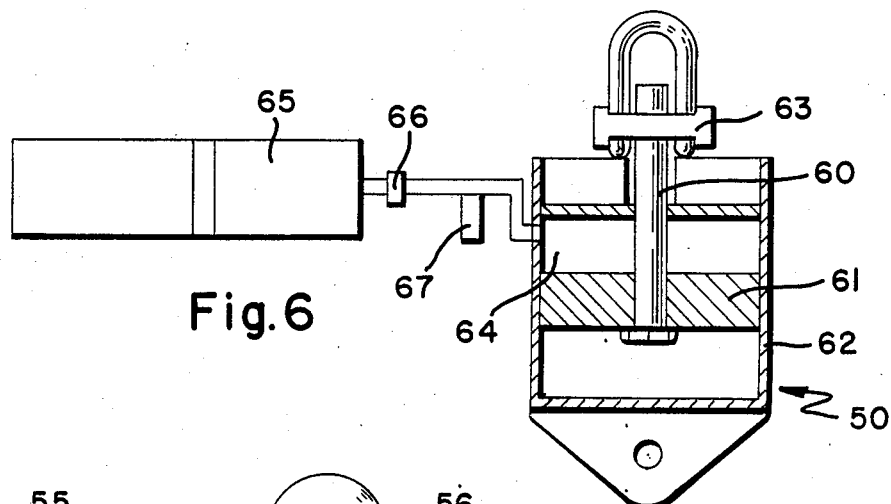
FIG. 6 illustrates the details of a trawl force transducer and safety release mechanism.

In the preferred embodiment the fixture 50 connecting the tow wire to the central connecting element is a remotely controlled hydraulic pressure system as shown in FIG. 6. The shaft 60 of a piston 61 in a special hydraulic cylinder 62 is connected to the tow wire through a shear pin 63. The other end of the fixture is securely connected to the positive spreader mechanism. The forward chamber 64 of the hydraulic cylinder is attached to a source of hydraulic pressure. The source 65 is provided with means to accept a remote signal to apply hydraulic pressure to this forward chamber in order to shear the shear pin 63 and release the tow wire from this fixture. The shear pin will also shear from overstress caused by a hang up of the net. A pressure sensing transducer 67 may be provided to send signals of the tow strain indicated by the hydraulic pressure in the upper chamber to a remote receiver, e.g., on the fishing vessel.

Figure 7:
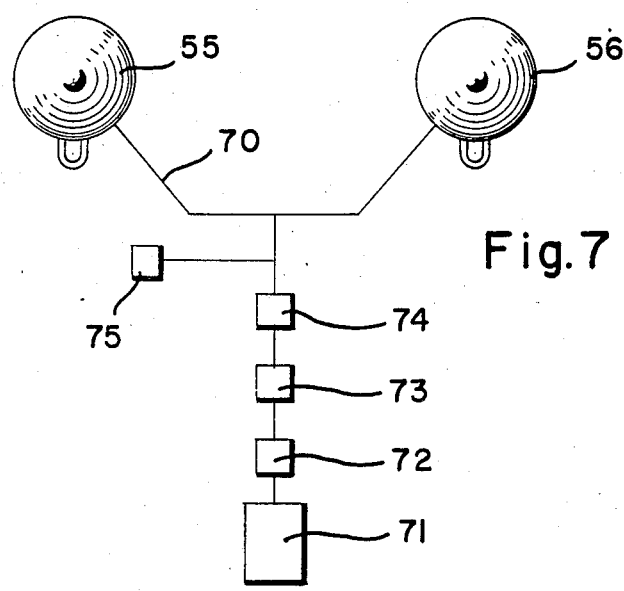
FIG. 7 is a schematic view of the buoyancy control mechanism.

The trawling apparatus of the present invention is provided, in the preferred embodiment, with a remote buoyancy control system to control the depth of trawling. This system incorporates a plurality of variable buoyancy floats, such as 55 and 56 shown in the schematic illustration in FIG. 7. Such floats are located at a plurality of locations along the trawling apparatus and connected by air hose 70 to a controllable air source. A high pressure air source, such as a SCUBA tank 71 passes through a first stage regulator 72 to produce the appropriately lower pressures for buoyancy control. A chosen air pressure for buoyancy control is established by a solenoid valve 73 activated remotely by a signal from the vessel, and by differential pressure regulator 74 to maintain the system at ambient pressure plus the differential set by the activation of the solenoid. An air pressure transducer 75 may be provided to provide pressure data to the remote control station on the vessel.

The operation and advantages of the present invention will now be clear in view of the above description. As the trawling apparatus is towed through the water, the positive spreader mechanism forces the net to be held open due to the action of the forces imparted by the tow wire and by the water flowing through the net. Thus, the spreading of the opening of the net is a positive action of the spreading mechanism and no doors are required to spread the net. Because the resistance of this apparatus through the water is significantly less than that of a trawl system provided with hydrodynamic doors, there is a savings of fuel, a capacity for towing larger nets, and a savings of handling time of gear. It is possible to operate this apparatus using the single warp line to the central common connecting element and still achieve a positive spread of the net. This increases the time and financial savings. All of the savings of time imply that a much larger catch is possible in a given amount of time. When the apparatus is to be hauled in, the manual or automatic activation of a mechanical or electromechanical haul-back mechanism 42 will allow the net to be collapsed to facilitate hauling in of the catch. This technique may also be used to retrieve a net which has snagged on an obstruction during bottom trawling.

The net may also be collapsed by activating the remotely controlled hydraulic pressure mechanism to shear the pin of the connecting fixture.

The use of a remotely controlled buoyancy system allows a changeover from one depth of fishing to another. Thus, if the vessel is doing bottom trawling and a catch indicator shows a school of fish some distance off the bottom, the buoyancy of the apparatus may be reset remotely to bring the apparatus to the proper depth for the school. Naturally, adjustments have to be made in engine speed as well as buoyancy for this kind of change. These changes may be made manually or by an automatic system. The buoyancy system may also be utilized to maneuver the apparatus over a bottom obstruction.

The apparatus of the present invention is well adapted to be used in a system as shown in FIG. 1 where multiple trawling nets are being towed behind a single powerful fishing vessel. The nets may naturally be dragged at similar depths or different depths.

It is to be understood that the embodiments set out in this description of the preferred embodiment are not meant to limit the scope of the invention, but to indicate some of its possible structural forms. It is apparent that minor changes may be made in the form and structure of the embodiments without departing from the material spirit of this invention. Thus, it is desired to protect all devices which come within the scope claimed.

The invention having been thus described what is claimed and desired to secure by Letters Patent is:

1. A doorless trawling apparatus for use with a fishing vessel and tow gear, comprising:
 (a) an elongated, bag-shaped net having a main axis and a opening through which the main axis passes,
 (b) a plurality of spreading bars emanating from a common connecting element, each bar being free to swing from a closed position along the main axis of the bag to a positively limited, open position at an angle away from the main axis, the common connecting element being an elongated, axial drag bar to which the spreading bars are each attached by a toggle mechanism,
 (c) a slider assembly secured to the axial common connecting element, but capable of longitudinal movement, the assembly comprising a sleeve and a plurality of pivot points,
 (d) a plurality of mediator bars, each pivotally connected at one end to the slider assembly and each pivotally connected at the other end to one of the spreader bars, and
 (e) means for applying a towing force by said tow gear to the common connecting element.

2. An apparatus as recited in claim 1, which is further provided with means to collapse the positive spreader mechanism to a closed position.

3. An apparatus as recited in claim 1, wherein the tow gear is connected top the common connecting element through a fixture which comprises a pressure transducer and a positive safety release mechanism.

4. An apparatus as recited in claim 1, further comprising a buoyancy control system incorporating a plurality of variable byoyancy floats and a remotely controllable air pressure supply to vary the buoyancy of the floats.

5. An apparatus as recited in claim 1, wherein the tow line is connected to the slider assembly, the assembly being so constrained in longitudinal motion toward the vessel that force applied to the slider assembly by the tow rope imparts the force to the slider toward the limit of its longtidinal motion, whereby the force is imparted to the mediator bars, thence to the spreader bars and to the opening of the net.

6. Apparatus as recited in claim 5, wherein: the slider assembly is limited in its forward motion by a stop on the drag bar.

7. Apparatus as recited in claim 6, further comprising means to secure the stop at a plurality of locations on the drag bar.

* * * * *

UNITED STATES PATENT AND TRADEMARK OFFICE
CERTIFICATE OF CORRECTION

PATENT NO. : 4,697,372

DATED : 6 October, 1987

INVENTOR(S) : Albert A. Leonard

It is certified that error appears in the above-identified patent and that said Letters Patent are hereby corrected as shown below:

Column 1, line 38, change "these" to --those--.

Claim 3, line 2, change "top" to --to--.

Column 1, line 34, change "is" to --if--.

Signed and Sealed this

Twenty-second Day of March, 1988

Attest:

DONALD J. QUIGG

*Attesting Officer*  *Commissioner of Patents and Trademarks*